INVENTOR
W. THELEN
BY R B [signature]
ATTORNEY

United States Patent Office 3,519,947

Patented July 7, 1970

3,519,947

ACTIVE RC WAVE TRANSMISSION NETWORK HAVING A 360° NON-MINIMUM PHASE TRANSFER FUNCTION

William Thelen, Salem, N.H., assignor to Bell Telephone Laboratories, Incorporated, Murray Hill, N.J., a corporation of New York Filed Feb. 23, 1968, Ser. No. 707,667
Int. Cl. H03f *3/68;* H03h *11/00*
U.S. Cl. 330—30 9 Claims

ABSTRACT OF THE DISCLOSURE

In a resistance/capacitance transmission network the input signal is first applied to two separate filter networks both of which have positive transfer functions. The first network is active and has a second order transfer function, whereas the other network is passive and has a first order transfer function. The individual outputs of the filter networks are subtracted from each other by applying the output of the active network to the inverting input and the output of the passive network through a resistor to the non-inverting input of a differential amplifier. The resulting output signal of the differential amplifier has a 360° non-minimum phase transfer function without having required any inductors in the wave transmission network.

BACKGROUND OF THE INVENTION

This invention relates to active wave transmission networks and, more specifically, to active RC wave transmission networks having 360° non-minimum phase transfer functions.

In certain circuit applications, particularly in the area of wave equalization, it is necessahy to operate on the phase characteristics of the signal being processed to obtain or maintain predetermined phase relationships. Phase shift networks are therefore introduced in the signal transmission path to delay the signal in a predetermined manner to obtain the required phase relationship. In order to obtain the greatest phase shift versatility such phase shift networks should have 360° non-minimum phase transfer characteristics in order to provide delay slopes—that is, the second derivative of the network's phase with respect to frequency—which are capable of being positive and negative as well as zero for different portions of the frequency spectrum. When it is required that the phase operations be performed without affecting the signal amplitude shape, a special type of non-minimum phase network, that is, one having an all-pass transfer function, is used to introduce the necessary phase shift without attenuating the signal.

Although prior art 360° non-minimum phase networks have had these operationally advantageous characteristics, they generally required the use of both capacitors and inductors or they were limited to active shaping networks having a negative transfer function. The necessity to employ inductors, while generally undesirable, is especially limiting when the networks are to be used in integrated circuits. The requirement that the active shaping networks have negative transfer functions, i.e., the transfer functions are comprised of the ratio of two polynominals with positive coefficients together with a negative coefficient as multiplier, entirely excludes certain classes of networks from such phase shift applications.

The utilization of active shaping netwoks having a positive transfer function, on the other hand, is the subject matter of a copending application by W. Thelen, Ser. No. 694,498, filed on Dec. 29, 1967. The arrangement disclosed in the above-cited application produces the required 360° non-minimum phase transfer function through the use of an active, positive transfer function network connected to the non-inverting input terminal of a differential amplifier. Such an arrangement requires the use of a very high input resistance to the negative input terminal of the differential amplifier when phase correction for the excess phase of the active shaping network is provided for.

A primary object of the invention is to increase the design freedom of 360° non-minimum phase networks which utilize active shaping networks having a positive transfer function.

Another object of the invention is to simplify the phase correction circuitry of the excess phase of the active shaping network in 360° non-minimum phase networks.

Still another object of the invention is to reduce the input resistance requirement to the negative input terminal of the differential amplifier in a 360° non-minimum phase network which utilizes an active shaping network having a positive transfer function.

SUMMARY OF THE INVENTION

To fulfill these objects of the invention two input signal components of the same polarity are subtracted from each other by applying one signal component through an active shaping network and a resistor to the inverting input terminal of a differential amplifier while the other signal component is routed through a passive input network to the non-inverting input terminal of the differential amplifier.

More specifically, in one embodiment of the invention the signal to be operated on is fed through two separate, individual paths to the inverting and the non-inverting input terminals, respectively, of the differential amplifier which performs the signal subtraction. While the one path to the non-inverting input terminal comprises only a passive RC network, the second input directed to the inverting input terminal is routed through an active RC shaping network which, in turn, is comprised of the tandem combination of a passive RC filter network and a non-inverting isolation amplifier. Since the transfer function of the passive RC network is positive and since the non-inverting isolation amplifier does not change the sign of the coefficients of the transfer function, the transfer function of the active shaping network is consequently also positive. The resulting transfer function has either band-pass or band-elimination characteristics depending upon the characteristics of the particular passive RC network which is used in conjunction with the active shaping network. The individual signals, modified in accordance with the characteristics of the networks in their particular path, are applied to the negative and positive differential inputs of the differential amplifier and, together with a negative feedback signal, provide the 360° non-minimum phase transfer characteristics for the wave transmission network without making it necessary to use inductors in the network.

A particular feature of the present invention is the added degree of freedom in the design of the filter network which is made possible through the inclusion of an additional design constant.

Another feature of the invention is the permitted reduction in the resistance value of the input resistor of the differential amplifier, thereby facilitating better integrated circuit fabrication of the wave transmission network.

DETAILED DESCRIPTION

Figure 1:
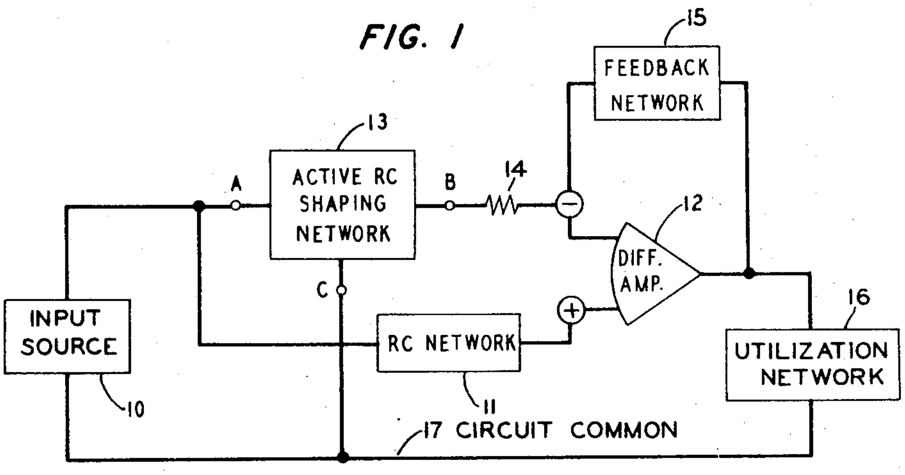
FIG. 1 is a block diagram of one embodiment of the invention.

In the wave transmission network illustrated in FIG. 1 of the drawing the input signal to be operated on is furnished by input source 10. One portion of the input signal which has predetermined amplitude and phase characteristics is fed through RC network 11 to the positive or non-inverting input terminal of differential amplifier 12, while another portion of the input signal is supplied through active RC shaping network 13 and input resistor 14 to the negative or inverting input terminal of differential amplifier 12. A feedback network 15 is connected between the output and the negative input terminal of differential amplifier 12, while the output of differential amplifier 12, is applied to utilization network 16. A common circuit connection 17 provides for the return paths between the individual circuits of the wave transmission network.

In the operation of the embodiment of the invention illustrated in FIG. 1 the signal furnished by input source 10 is operated on by the wave transmission network in order to modify and to supply to utilization network 16 an output signal which has the amplitude and phase characteristics required by the particular network application. Input source 10 may, for instance, represent part of a transmission line in which the transmission signal is subjected to undesired amplitude and phase effects which are to be compensated for in the wave transmission network of the present invention. That is, in the wave transmission network illustrated in FIG. 1 the signal may be subjected to specific, predetermined amplitude and phase changes to accomplish the necessary compensation. In the special case in which only the phase of the transmitted signal is to be changed, the transfer function of the wave transmission network is designed to have all-pass characteristics; that is, predetermined phase adjustments may be accomplished on the signal without changing the amplitude characterics of the signal.

Figure 2:
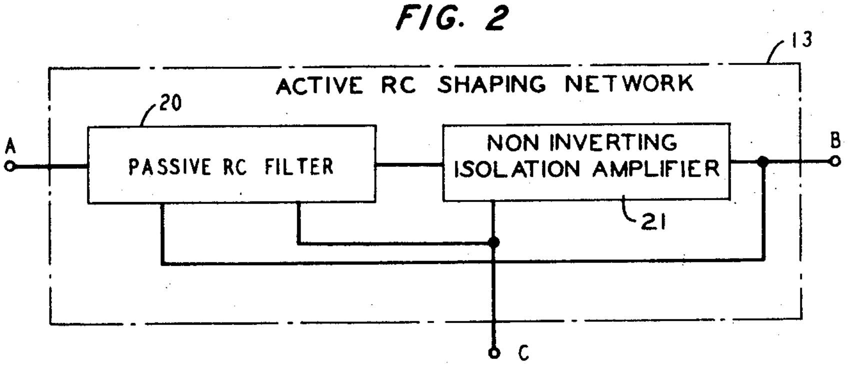
FIG. 2 is a block diagram of an active RC shaping network which can be used in the embodiment of the invention illustrated in FIG. 1.

In order for the wave transmission network to produce the required 360° non-minimum phase transfer characteristics active RC shaping network 13 takes the form illustrated in FIG. 2; that is, it is comprised of a passive RC filter 20 and a non-inverting solution amplifier 21. Filter 20 and amplifier 21 are connected in tandem by connecting the output of filter 20 to the input of amplifier 21. The input terminal of filter 20 is the input to network 13, while the output of amplifier 21 is the output of network 13. Filter 20 and amplifier 21 each have one connection to circuit common the wave transmission network via terminal C of network 13. The feedback connection between the output of amplifier 21 and filter 20 shown in FIG. 2 makes it possible for active RC shaping network 13 to realize a transfer function which may have complex poles either by themselves or in addition to negative real poles. Without the feedback connection and using the same RC filter as used with the feedback connection, on the other hand, the transfer function of the active shaping network is restricted to negative real poles.

Figures 5, 6, 7, 8:
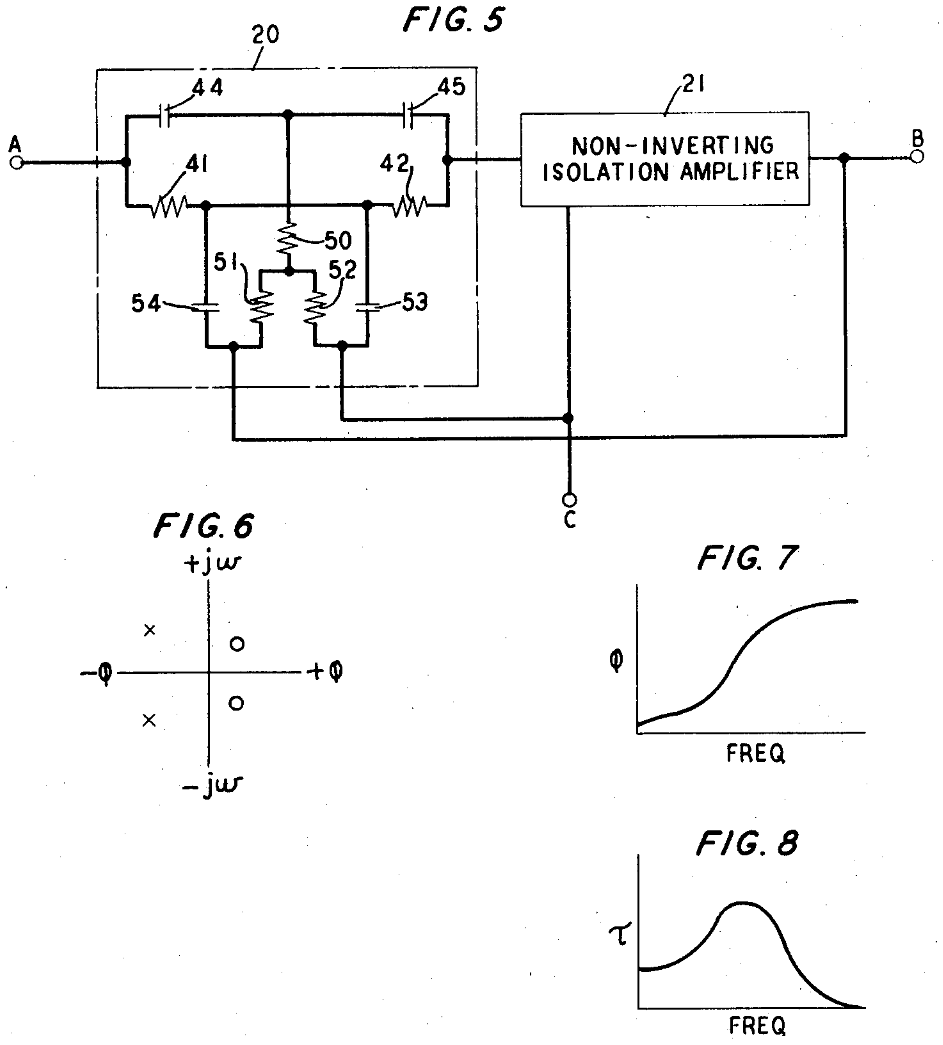
FIG. 6 is a pole-zero diagram in the complex frequency plane of a typical network having a 360° non-minimum phase transfer characteristic.
FIGS. 7 and 8 are curves of the phase and delay characteristics, respectively, of a 360° non-minimum phase network.

FIG. 6 illustrates the pole-zero location in the complex frequency plane of a typical, simple network having a 360° non-minimum phase transfer function. FIGS. 7 and 8 represent the phase and delay characteristics, respectively, of the network of FIG. 6. Of particular importance is the shape of the delay curve of FIG. 8 which illustrates the possibility of having increasing as well as decreasing rates of delay which is characteristic of a 360° non-minimum phase-shift network.

Figure 9:
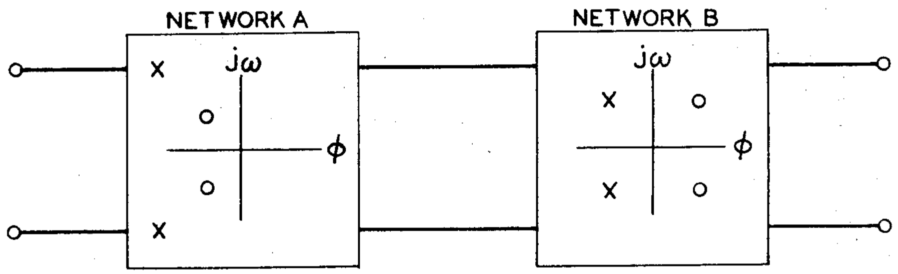
FIG. 9 illustrates a prior art method of obtaining a 360° non-minimum phase network by combining two networks A and B each having distinct, separate pole-zero characteristics.

One specific advantage of the wave transmission network of the present invention is the one-step method of design. That is, the entire network is one design block which produces the required phase and amplitude characteristics as a unity. One prior art approach to obtain a 360° non-minimum phase transfer function network required the design of two separate networks A and B having characteristics illustrated in FIG. 9. By cascading the two networks A and B it is possible to obtain the combined characteristics as illustrated in FIG. 6, since the poles of passive network B cancel the zeros of passive network A. Distinct disadvantages of this last approach are twofold, namely, (1) two separate design efforts are necessary and (2) the networks require the use of inductors, the latter requirement being totally unacceptable for networks to be used in integrated circuits.

Figure 10:
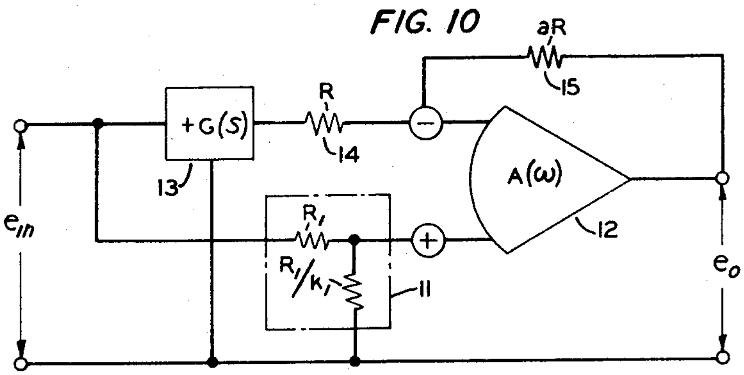
FIG. 10 is a mathematical model of a 360° non-minimum phase wave transmission network which is used to derive the required design equations for the embodiment of the present invention.

In order to derive the design equations for the 360° non-minimum phase network of the present invention, the simplified mathematical model of the network as illustrated in FIG. 10 will be utilized. Components in FIG. 10 equivalent to those of FIG. 1 have been given identical numerical designations. That is, resistors having resistances $R_1$ and $R_1/k_1$ replace RC network 11, an operational amplifier having an open loop gain $A(\omega)$ takes the place of differential amplifier 12, a network having a voltage transfer function $+G(s)$ represents active RC shaping network 13, and a resistor of resistance $a$R simulates feedback network 15, while resistor 14 of resistance R represents the input resistor to the negative input terminal of differential amplifier 12. In the above mathematical model the gain A of the operational amplifier is a function of the angular frequency $\omega$, and the resistance $a$R of resistor 15 is related by the constant $a$ to the resistance R of input resistor 14. The transfer function of the active shaping network $+G(s)$ is the voltage transfer function which, in turn, is a function of the complex frequency $s=\gamma+j\omega$ having $\gamma$ as its real and $j\omega$ as its imaginary components and is comprised of a ratio of two polynominals with positive coefficients together with a positive coefficient as multiplier as designated by the $+$ sign. Input voltage $e_{in}$ has been substituted for input source 10 and voltage $e_o$ simulates the output voltage of the network as applied to utilization network 16.

An important feature of the present invention is the utilization of resistor $R_1$ and $R_1/k_1$ in network 11 of the embodiment of the invention illustrated in FIG. 10. The inclusion of the scaling factor $k_1$ makes it possible to use signal levels which otherwise would make it impossible to obtain the desired poles and zeros of the wave transmission network, thereby affording an additional degree of design freedom.

Another important feature of the present invention is the elimination of an unwanted Thevenin impedance which occurs when it is necessary to connect the passive RC network to the negative input terminal of the differential amplifier. In order to prevent such undesired effects of a Thevenin impedance it is necessary to make the resistance of input resistor 14 extremely large, which is an undesirable requirement in integrated circuit applications. In the present invention the passive RC network, however, is applied to the positive input terminal of the differential amplifier. Since the positive input terminal exhibits a very high input impedance, it is not necessary to include a high resistance input resistor in the signal path to the positive input terminal. Input resistor 14, on the other hand, is preceded by an active device with a low output impedance, so that the resistance of resistor 14 need not be of an extremely large value, thereby improving the integrated circuit fabrication capabilities of the wave transmission network of the present invention.

The following transfer function may be derived for the model network illustrated in FIG. 10:

$$\frac{e_o}{e_{in}}=\left(\frac{a+1}{k_1+1}\right)\left[1-(a)\left(\frac{k_1+1}{a+1}\right)G(s)\right]\left(\frac{1}{1+\frac{a+1}{A(\omega)}}\right) \qquad (1)$$

In order for the circuit to be stable, the following conditions—which can be satisfied by standard design procedures and can be checked by the conventional phase and gain margin approach—must exist:

$$\begin{aligned} A(\omega)&\neq-(a+1)\\ a&>0\\ k_1&\geq 0 \end{aligned} \qquad (2)$$

and G($s$) is stable.

Once the stability conditions have been satisfied, a constant equal to $k_2$ may be introduced in Equation 1 to replace the term:

$$\frac{a+1}{k_1+1} \qquad (3)$$

In addition, the term $$\frac{1}{1+\frac{a+1}{A(\omega)}}$$

may be ignored, whereby the following simplified transfer function results:

$$\frac{e_o}{e_{in}}=k_2\left[1-\left(\frac{a}{k_2}\right)G(s)\right] \qquad (4)$$

which may be rewritten as:

$$\frac{e_o}{e_{in}}=k_2\left(\frac{k_2-aG(s)}{k^2}\right) \qquad (5)$$

After cancellation of common terms, the following important circuit function remains:

$$k_2-aG(s) \qquad (6)$$

In the instant invention the desired network is to have a 360° non-minimum phase transfer function which may be represented by a polynominal of the second degree. Consequently, Equation 6, that is, the circuit function equating the polynominal with Equation 6 can then be solved for G($s$) to determine the general form which G($s$) will take.

Figure 11:
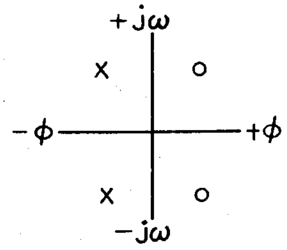
FIG. 11 is a pole-zero diagram in the complex frequency plane of one embodiment of the invention which has a 360° all-pass transfer function.

G($s$) may, in its most general form, be solved for any one of an unlimited number of non-minimum phase networks. The solution is, however, of particular interest in the special case when the 360° non-minimum phase network assumes all-pass characteristics. That is, the zeros in the complex frequency plane all lie in the right-half plane and are the negatives of the poles which must inherently lie in the left-half plane. The absolute value of the transfer function of such all-pass networks, that is, its gain, is constant for all frequencies while the phase angle, however, varies as a function of frequency. Consequently, such an all-pass network may be used to affect the phase or delay of a signal without introducing any signal attenuation. FIG. 11 illustrates in the complex frequency plane the pole-zero location of such 360° all-pass network which may have phase and delay characteristics as shown in FIGS. 7 and 8, respectively.

The transfer function for such 360° all-pass network may generally be expressed as follows:

$$\pm\frac{s^2-2\frac{\omega_c}{b}s+\omega_c^2}{s^2+2\frac{\omega_c}{b}s+\omega_c^2} \qquad (7)$$

in which $s=\gamma+j\omega$ is a complex frequency having $\gamma$ as its real and $j\omega$ as its imaginary components, $\omega_c$ is the natural frequency of the network, and $b$ is a constant which defines the phase characteristics of the network. Equating the 360° all-pass function (7) with the circuit function (6) results in the following identity:

$$\pm\frac{s^2-2\frac{\omega_c}{b}s+\omega_c^2}{s^2+2\frac{\omega_c}{b}s+\omega_c^2}\equiv k_2-aG(s) \qquad (8)$$

In order to simplify the equation $k_2$ may be set equal to one. Solving Equation 8 for G($s$) results in two possible solutions:

(a)

$$G(s)=\frac{2}{a}\left(\frac{2\frac{\omega_c}{b}s}{s^2+2\frac{\omega_c}{b}s+\omega_c^2}\right) \qquad (9)$$

and (b)

$$G(s)=\frac{2}{a}\left(\frac{s^2+\omega_c^2}{s^2+2\frac{\omega_c}{b}s+\omega_c^2}\right) \qquad (10)$$

G($s$) is therefore realizable in two different forms, each realization being in terms of a positive transfer function, whose Equations 9 and 10 represent second degree band-pass and band-elimination filters, respectively.

FIG. 2 is a block diagram of an active RC shaping network 13 which has a transfer function +G($s$) and which comprises passive RC filter 20 and non-inverting isolation amplifier 21. The form of the transfer function is principally determined by the passive RC filter 20 together with the feedback arrangement of amplifier 21 in which the amplifier provides the required isolation and versatility of the circuit arrangement.

Figure 3:
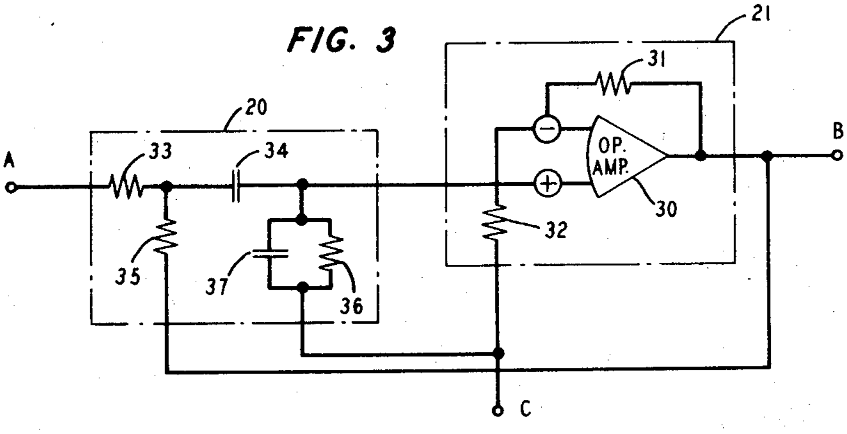
FIG. 3 is a schematic diagram of one type of passive RC filter and operational amplifier which may be used as the active RC shaping network in the embodiment of the invention of FIG. 1.
Figure 4:
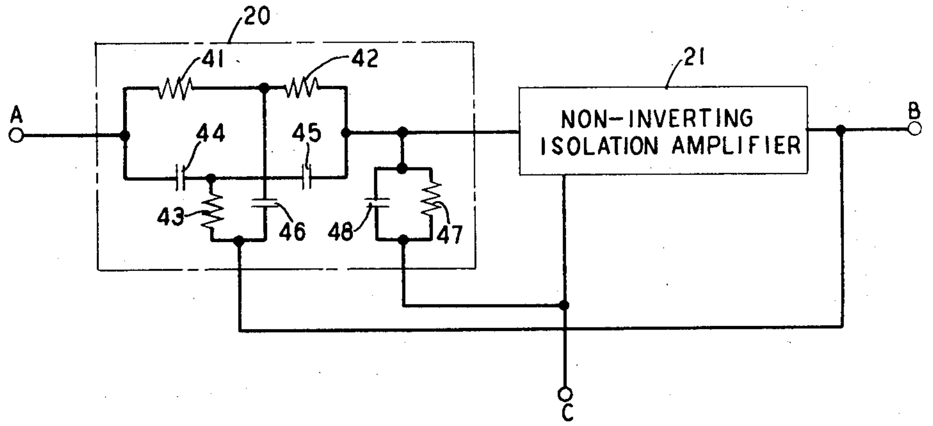
FIGS. 4 and 5 illustrate additional RC passive filter networks which may be used in the active RC shaping network of the present invention.

FIGS. 3, 4, and 5 are specific embodiments of RC shaping network 13 each of which produces the required positive transfer function. In the embodiment of FIG. 3 non-inverting isolation amplifier 21 has been replaced by an operational amplifier 30 together with a divider network comprising resistors 31 and 32. Filter 20 of FIG. 3 receives its input through resistor 33 and couples its output through capacitor 34 to the positive input terminal of operational amplifier 30. Resistor 33 and capacitor 34 have their other terminals connected together and coupled through resistor 35 to the output of operational amplifier 30 to provide for a positive feedback connection. Without the feedback connection, that is, with resistor 35 being returned to circuit common of the wave transmission network as represented by point C, the transfer function of the shaping network is limited to negative real poles, while the feedback connection makes it possible to obtain complex poles as well. The parallel combination of resistor 36 and capacitor 37, connected from the juncture of capacitor 34 and the positive input terminal of operational amplifier 30 to circuit common of the wave transmission network, is an additional part of passive RC filter 20 necessary to make the active RC shaping network 13 have the required band-pass characteristic.

Figure 12:
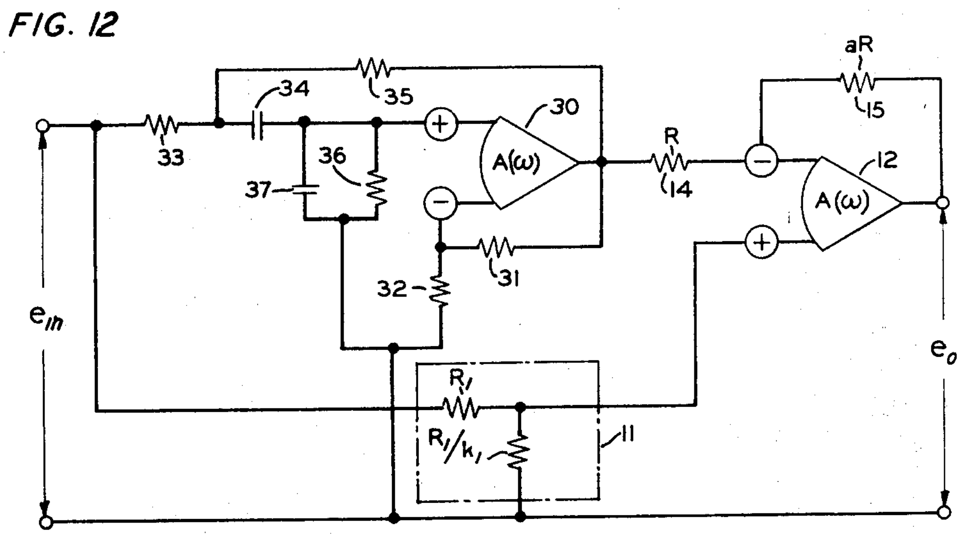
FIG. 12 is a schematic diagram of a specific 360° all-pass network incorporating the RC shaping network shown in FIG. 3.

FIG. 12 is a schematic diagram of a specific 360° all-pass network incorporating the RC shaping network arrangement of FIG. 3. Although the active RC filter illustrated in FIG. 12 has band-pass filter characteristics, embodiments of the invention are not limited to this category of filters but may incorporate band-elimination filters as well. FIGS. 4 and 5 illustrate the use of band-elimination characteristics by employing parallel-T RC filters in the active RC shaping network to obtain the desired 360° non-minimum phase transfer characteristics for the wave transmission network.

In FIG. 4 passive RC filter 20 has resistors 41, 42, and 43 as well as capacitors 44, 45, and 46 interconnected in the conventional manner to form a parallel-T network which, in turn, is connected in tandem with isolation amplifier 21. The common arm of the parallel-T filter is connected to provide for the required feedback by returning the juncture of resistor 43 and capacitor 46 to the output of isolation amplifier 21. Resistor 47 and capacitor 48 are connected from the juncture of the output of passive filter 20 and the input of isolation amplifier 21 to circuit common to reduce the input signal amplitude to non-inverting isolation amplifier 21. As a result, an operational amplifier having a gain greater than one may be used as the non-inverting isolation amplifier in the embodiment of the invention illustrated in FIG. 4.

In an alternate embodiment of the invention the parallel combination of resistor 47 and capacitor 48 may be replaced by the series arrangement of a resistor and a capacitor.

With resistor 47 and capacitor 48 removed from the embodiment of the present invention illustrated in FIG. 4, active RC shaping network 13 requires a non-inverting isolation amplifier which has a gain of less than one to assure operating stability of the network. In order to be able to use an operational amplifier of the general type, i.e., one having a gain greater than unity, to perform the required non-inverting isolation function, it is necessary to add the parallel or series combination of resistor 47 and capacitor 48 at the input of the operational amplifier as illustrated in FIG. 4. The resistor/capacitor combination reduces the effective overall gain of the shaping network by reducing the input signal amplitude to the amplifier, thereby assuring its operating stability.

This required addition of resistor 47 and capacitor 48, however, increases the total amount of resistance and capacitance in the circuit by the value of the two components. Although these additions in resistance and capacitance may not be important in conventional circuits, they become very significant in integrated circuit applications, particularly so when the networks are to be produced on thin-film substrates.

FIG. 5 illustrates an active RC shaping network in which the passive RC filter has been redesigned to optimize its application to integrated circuits. Although the passive RC filter networks of FIG. 4 and FIG. 5 are equivalent in their operating characteristics, their structure and some component values have been altered. In the passive filter of FIG. 5 components which are identical to those of FIG. 4 have retained the same numerical designations, whereas resistor 43 has been replaced by resistors 50, 51, and 52, and capacitors 53 and 54 take the place of capacitor 46, whereas resistor 47 and capacitor 48 have been eliminated altogether. Since large values of capacitances often take up most of the substrate area and, therefore, constitute the dominating space factor, an optimization of capacitance is most desirable in integrated circuit applications. It is also desirable, however, to optimize resistance values, although their effects on integration are usually only secondary.

In the circuit illustrated in FIG. 5 this optimization has been obtained by assigning the following values to the new components, where the new component values have been expressed in terms of the replaced components, in which K is any positive constant greater than 1:

$$C_{54}=\frac{C_{46}}{K} \tag{11}$$

$$C_{53}=C_{46}\left(\frac{K-1}{K}\right) \tag{12}$$

The total capacitance of the passive RC filter has now been reduced to be equal to the capacitance of former capacitor 46—even though two capacitors $C_{53}$ and $C_{54}$ are in the circuit—that is, the additional capacitance of capacitor 37 which was formerly required has been totally eliminated. The total resistance value, on the other hand, varies as a function of the value of the conversion constant K and may be optimized to a total resistance value of at most twice the resistance of resistor 43, which is still less than the resistance required for the previous method. The selection of the individual resistors is governed by the following design table:

(13)

| K | $R_{50}$ | $R_{52}$ | $R_{51}$ |
|---|---|---|---|
| $1<K\geq 2$ | $\frac{K}{2K-1}(R_{43})$ | $=R_{50}$ | $\frac{K-1}{2K-1}(R_{43})$ |
| $K>2$ | $\frac{K}{K+1}(R_{43})$ | $\frac{K}{K^2-1}(R_{43})$ | $=R_{50}$ |

When in the design of a particular active RC shaping network an unwanted phase shift is introduced due, for example, to excess phase shifts in the amplifier, the gain as well as the phase characteristics of the overall wave transmission network are detrimentally affected. These effects are particularly undesirable when they affect the gain of an all-pass network by varying its gain as a function of frequency instead of holding it constant over the frequency band.

Such an excess phase shift of active RC shaping network 13 present at the negative input terminal of the differential amplifier 12 may be compensated for by introducing an equal phase shift in the input signal present at the positive input terminal of the amplifier. Because of its differential input characteristics, the differential amplifier cancels these two equal phase components to eliminate the effects of the initial, unwanted phase component of the active RC shaping network.

The required phase shift compensating signal component may be generated, for instance, by modifying RC network 11, to inject at the positive input terminal of the differential amplifier an additional signal component which has a phase component equal to the undesired phase component present at the negative input terminal to cause the latter's cancellation in the differential amplifier.

It is to be understood that the above-described arrangements are illustrative of the application of the principles of the invention. Numerous other arrangements may be devised by those skilled in the art without departing from the spirit and scope of the invention.

What is claimed is:

1. A wave transmission network having a 360° non-minimum phase transfer function connected between an input source of signal and a utilization network comprising a first active resistor-capacitor shaping network having a positive transfer function, a second resistor-capacitor network, said first active resistor-capacitor shaping network and said second resistor-capacitor network having their inputs connected to said input source of signal, a differential amplifier having first and second input terminals and an output terminal, a feedback network connected from said output terminal of said differential amplifier to said first input terminal of said differential amplifier to provide a negative feedback path for said differential amplifier, means connecting said utilization network to the output of said differential amplifier, means connecting the output of said second resistor-capacitor network to the said second input terminal of said differential amplifier, and a resistor connecting the output of said first active resistor-capacitor shaping network to the said first input terminal of said differential amplifier, whereby said wave transmission network is characterized by a 360° non-minimum phase transfer function.

2. A wave transmission network in accordance with claim 1 in which the phase characteristic of said second resistor-capacitor network corrects for any excess phase shift of the said first active resistor-capacitor shaping network, whereby the relative phase shift between the signals from said input source to the first and second input terminals of said differential amplifier is optimized.

3. A wave transmission network in accordance with claim 1 in which said first active resistor-capacitor shaping network comprises a passive filter network which includes only resistive and capacitive elements and a first non-inverting isolation amplifier having input and output terminals connected in tandem with said passive filter network to isolate said passive filter network from subsequent circuitry, whereby said active shaping network realizes predetermined frequency selective characteristics.

4. A wave transmission network in accordance with claim 2 in which said first active resistor-capacitor shaping network is a band-elimination filter.

5. A wave transmission network in accordance with claim 3 in which said first active resistor-capacitor shaping network is a band-pass filter.

6. A wave transmission network in accordance with claim 3 in which said first active resistor-capacitor shaping network additionally includes means to connect the output of said first non-inverting isolation amplifier to said passive filter network and the output of said first amplifier.

7. A wave transmission network in accordance with claim 6 in which said first active resistor-capacitor shaping network is characterized by roots which comprise a plurality of complex zeros and a plurality of negative real poles in the complex frequency plane.

8. A wave transmission network in accordance with claim 6 in which said first active resistor-capacitor shaping network is characterized by roots which comprise a plurality of complex zeros and a plurality of complex poles in the complex frequency plane.

9. A wave transmission network in accordance with claim 6 in which said first active resistor-capacitor shaping network is characterized by roots which comprise at least one real zero and a plurality of complex poles in the complex frequency plane.

References Cited

UNITED STATES PATENTS

| | | | |
|---|---|---|---|
| 2,957,042 | 10/1960 | Gibson et al. ______ | 333—28 X |
| 3,436,490 | 4/1969 | Roelofs ____________ | 330—69 X |

NATHAN KAUFMAN, Primary Examiner

U.S. Cl. X.R.

330—69, 185